US008260732B2

(12) United States Patent
Al-Duwaish et al.

(10) Patent No.: US 8,260,732 B2
(45) Date of Patent: Sep. 4, 2012

(54) METHOD FOR IDENTIFYING HAMMERSTEIN MODELS

(75) Inventors: Hussain N. Al-Duwaish, Dhahran (SA);
Syed Z. Rizvi, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 505 days.

(21) Appl. No.: 12/591,605

(22) Filed: Nov. 24, 2009

(65) Prior Publication Data

US 2011/0125686 A1   May 26, 2011

(51) Int. Cl.
*G06E 1/00* (2006.01)
*G06E 3/00* (2006.01)
*G06F 15/18* (2006.01)
*G06G 7/00* (2006.01)
(52) U.S. Cl. ......................................................... 706/20
(58) Field of Classification Search ..................... 706/20
See application file for complete search history.

(56) References Cited

U.S. PATENT DOCUMENTS

| | | | |
|---|---|---|---|
| 5,706,400 | A | 1/1998 | Omlin et al. |
| 6,130,909 | A | 10/2000 | Anvari et al. |
| 6,516,309 | B1 | 2/2003 | Eberhart et al. |
| 6,700,648 | B2 | 3/2004 | Jun et al. |
| 6,963,303 | B1 | 11/2005 | Beisner |
| 7,039,475 | B2 | 5/2006 | Sayyarrodsari et al. |
| 7,272,454 | B2 | 9/2007 | Wojsznis et al. |
| 7,418,301 | B2 | 8/2008 | Boe et al. |
| 2003/0018399 | A1 | 1/2003 | Havener et al. |
| 2005/0033122 | A1 | 2/2005 | Balkin et al. |
| 2005/0196047 | A1 | 9/2005 | Owechko et al. |
| 2007/0019865 | A1 | 1/2007 | Owechko et al. |
| 2007/0142975 | A1 | 6/2007 | Piche |
| 2008/0071397 | A1 | 3/2008 | Rawlings et al. |
| 2008/0208778 | A1 | 8/2008 | Sayyar-Rodsari et al. |
| 2008/0293372 | A1 | 11/2008 | Principe et al. |

FOREIGN PATENT DOCUMENTS

| | | |
|---|---|---|
| CN | 101276207 A | 10/2008 |
| WO | WO 93/25943 | 12/1993 |
| WO | WO2006132988 A1 | 12/2006 |

OTHER PUBLICATIONS

Gomez, Juan and Enrique Baeyens. "Subspace Identification of Multivariable Hammerstein and Wiener Models" 15th Triennial World Congress, Barcelona, Spain. 2002. [Online] DOwnloaded Jun. 7, 2012. http://www.nt.ntnu.no/users/skoge/prost/proceedings/ifac2002/data/content/02703/2703.pdf.*

(Continued)

*Primary Examiner* — Ben Rifkin
(74) *Attorney, Agent, or Firm* — Richard C. Litman (57) ABSTRACT

The computerized method for identifying Hammerstein models is a method in which the linear dynamic part is modeled by a space-state model and the static nonlinear part is modeled using a radial basis function neural network (RBFNN). Accurate identification of a Hammerstein model requires that output error between the actual and estimated systems be minimized. Thus, the problem of identification is an optimization problem. A hybrid algorithm, based on least mean square (LMS) principles and the Subspace Identification Method (SIM) is developed for the identification of the Hammerstein model. LMS is a gradient-based optimization algorithm that searches for optimal solutions in the negative direction of the gradient of a cost index. In the method, LMS is used for estimating the parameters of the RBFNN. For estimation of state-space matrices, the N4SID algorithm for subspace identification is used.

7 Claims, 8 Drawing Sheets

OTHER PUBLICATIONS

Nelles, Oliver and Rolf Isermann. "Identification of Nonlinear Dynamic Systems, Classical methods veruses Radial Basis Function Networks" Proceedings of the American Control COnference Jun. 1995. [Online] Downloaded Jun. 7, 2012 http://ieeexplore.ieee.org/stamp/stamp.jsp?tp=&arnumber=533847.*

Overschee, Peter and Bart De Moor "N4SID: Subspace Algorithms for the Identifcation of Combined Deterministic-Stochastic Systems" Special Issue on statistical signal processing and control. 1994 [Online] Downloaded Jun. 7, 2012 http://www.sciencedirect.com/science/article/pii/0005109894902305.*

Goethals, Ivan et al "Subspace Identifiaction of Hammerstein Systems UsingLeast Squares Support Vector Machines" IEEE Transactions on Automatic Control, vol. 50, No. 10 Oct. 2005. [Online] DOwnloaded Jun. 7, 2012 http://ieeexplore.ieee.org/stamp/stamp.jsp?tp=&arnumber=1516254.*

* cited by examiner

METHOD FOR IDENTIFYING HAMMERSTEIN MODELS

BACKGROUND OF THE INVENTION

1. Field of the Invention

The present invention relates to numerical modeling techniques used in engineering, and particularly to a computerized method for identifying Hammerstein models in which the linear dynamic part is modeled by a space-state model and the static nonlinear part is modeled using a radial basis function neural network (RBFNN).

2. Description of the Related Art

Many practical or "real world" systems inherently have nonlinear characteristics, such as saturation, dead-zones, etc. Identification of such systems is extremely important for prediction or control design. Nonlinear system identification has therefore been a subject of considerable research in the recent. One promising approach for nonlinear system identification is based on the assumption that the identified systems consist of relatively simple subsystems, and that the structure of the subsystems are known. This is commonly known as a "block-oriented approach". Based on this approach, systems can be broken down into linear and nonlinear parts, separate from each other. The subsystems are then identified on the basis of the input-output signals of the whole system, and the a priori information about the system.

Block-oriented models have been applied to represent physical and biological systems. They have been used to model an electrical generator, communication bandpass circuits, a distillation column, the visual cortex, and pH control systems, along with an electrical drive. The Hammerstein Model belongs to a family of block-oriented models, and is made up of a memoryless nonlinear part followed by a linear dynamic part. It has been known to effectively represent and approximate several industrial processes, such as pH neutralization processes, distillation column processes, and heat exchange processes. Hammerstein models have also been used to successfully model nonlinear filters, biological systems, water heaters, and electrical drives.

A significant amount of research has been carried out on identification of Hammerstein models. Systems can be modeled by employing either nonparametric or parametric models. Nonparametric representations involve kernel regression or expansion of series, such as the Volterra series. This results in a theoretically infinite number of model parameters, and is therefore represented in terms of curves, such as step responses or bode diagrams. Parametric representations, such as state-space models, are more compact, as they have fewer parameters and the nonlinearity is expressed as a linear combination of finite and known functions.

Development of nonlinear models is the critical step in the application of nonlinear model-based control strategies. Nonlinear behavior is prominent in the dynamic behavior of physical systems. Most physical devices have nonlinear characteristics outside a limited linear range. In most chemical processes, for example, understanding the nonlinear characteristics is important for designing controllers that regulate the process. It is rather difficult, yet necessary, to select a reasonable structure for the nonlinear model to capture the process nonlinearities. The nonlinear model used for control purposes should be as simple as possible, warranting minimal computational load and, at the same time, retaining most of the nonlinear dynamic characteristics of the system.

Many model structures have been proposed for the identification of nonlinear systems. The nonlinear static block followed by a dynamic block in the Hammerstein structure has been found to be a simple and effective representation for capturing the dynamics of typical chemical engineering processes, such as distillation columns and heat exchangers. Nonlinear system identification involves the following tasks: structure selection, including selection of suitable nonlinear model structures and the number of model parameters; input sequence design, including the determination of the input sequence $u(t)$, which is injected into the system to generate the output sequence $y(t)$; noise modeling, which includes the determination of the dynamic model which generates the noise input $w(t)$; parameter estimation, which includes estimation of the remaining model parameters from the dynamic system data $u(t)$ and $y(t)$, and the noise input $w(t)$; and model validation, including the comparison of system data and model predictions for data not used in model development.

Figure 2:
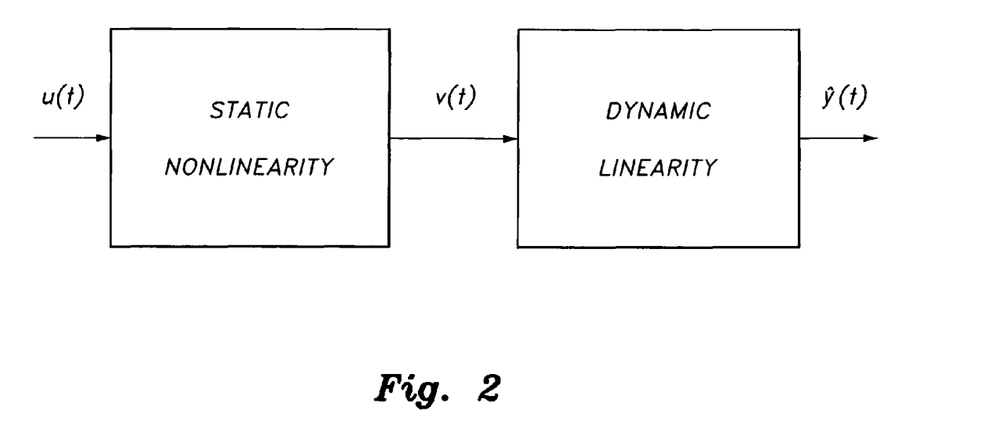
FIG. 2 is a block diagram of a Hammerstein model.

In the Hammerstein, a nonlinear system is represented as a nonlinear memoryless subsystem $f(.)$ followed by a linear dynamic part. The input $u(t)$ and the output $y(t)$ are observable, but the intermediate signal $v(t)$ is not. As shown in FIG. 2, the static nonlinear element scales the input $u(t)$ and transforms it to $v(t)$ through a nonlinear arbitrary function $f(u)$. The dynamics of the system are modeled by a linear transfer function, whose output is $y(t)$.

Many different techniques have been proposed for the black-box estimation of Hammerstein systems from input-output measurements. These techniques mainly differ in the way that static nonlinearity is represented and in the type of optimization problem that is finally obtained. In parametric approaches, the static nonlinearity is expressed in a finite number of parameters. Both iterative and non-iterative methods have been used for determination of the parameters of the static-nonlinear and linear-dynamic parts of the model. Typical techniques, however, are extremely costly in terms of computational time and energy. Thus, a method for identifying Hammerstein models solving the aforementioned problems is desired.

SUMMARY OF THE INVENTION

The computerized method for identifying Hammerstein models is a method in which the linear dynamic part is modeled by a space-state model and the static nonlinear part is modeled using a radial basis function neural network (RBFNN). Accurate identification of a Hammerstein model requires that output error between the actual and estimated systems be minimized. Thus, the problem of identification is an optimization problem. A hybrid algorithm, based on least mean square (LMS) principle and Subspace Identification Method (SIM) is developed for the identification of the Hammerstein model. LMS is a gradient based optimization algorithm that searches for optimal solution in the negative direction of the gradient of a cost index. In this invention, LMS is used for estimating the parameters of the RBFNN. For estimation of state-space matrices, the N4SID algorithm for subspace identification is used.

The computerized method includes the steps of: (a) receiving an initial set of nonlinear Hammerstein system data from a plant (the nonlinear data is obtained by sampling the input and output data physically at an industry plant; data collection is a task which is undertaken at the plant to be modeled and controlled. Typically, plant data is collected through PLCs equipped with I/O cards designed for this purpose); (b) estimating a set of state-space matrices A, B, C and D from the initial set of nonlinear Hammerstein system data using subspace identification; (c) initializing a radial basis function neural network with a random set of weights; (d) calculating an output value $\hat{y}(t)$; (e) calculating an error value based upon the output value ŷ(t) calculated in step (d) and based upon the estimation of step (b); (f) updating the set of synaptic weights for the radial basis function neural network to train the radial basis function neural network; (g) following training of the radial basis function neural network, calculating intermediate data v; (h) estimating the state-space matrices A, B, C and D from the radial basis function neural network outputs v calculated in step (g) and a set of original system outputs y; (i) calculating a set of system outputs ŷ from the estimated state-space matrices A, B, C and D of step (f); (j) calculating an output error measure; and (k) repeating steps (c) to (j) if the calculated output error measure is greater than a pre-selected threshhold error measure.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The computerized method for identifying Hammerstein models is a method in which the linear dynamic part is modeled by a space-state model and the static nonlinear part is modeled using a radial basis function neural network (RBFNN). Accurate identification of a Hammerstein model requires that output error between the actual and estimated systems be minimized. Thus, the problem of identification is an optimization problem. A hybrid algorithm, based on least mean square (LMS) principle and Subspace Identification Method (SIM) is developed for the identification of the Hammerstein model. LMS is a gradient based optimization algorithm that searches for optimal solution in the negative direction of the gradient of a cost index. In this invention, LMS is used for estimating the parameters of the RBFNN. For estimation of state-space matrices, the N4SID algorithm for subspace identification is used.

Figure 1:
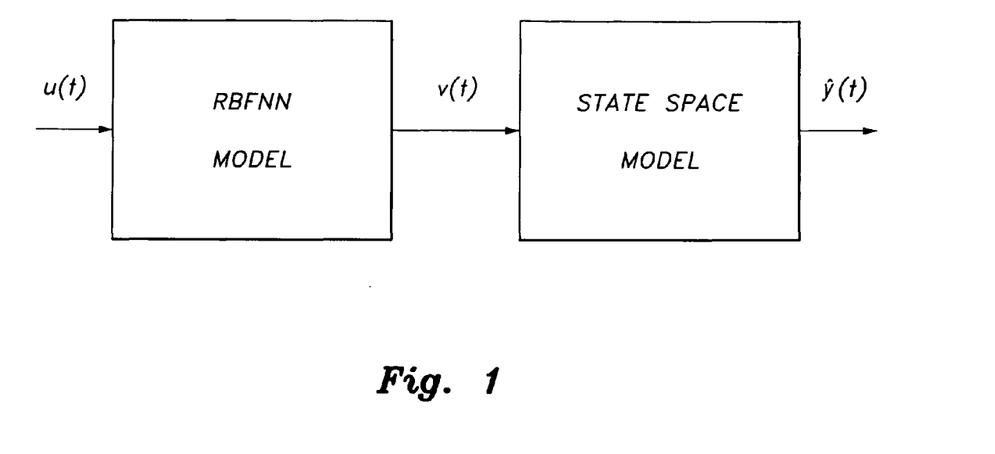
FIG. 1 is a block diagram of a block-oriented model used in a computerized method for identifying Hammerstein models according to the present invention.

As noted above, the linear dynamic part of the Hammerstein model is modeled by a state-space model. The static nonlinear part of the Hammerstein model is modeled using RBFNN. The external inputs to the system u(t) are fed to the RBFNN, as best illustrated in FIG. 1. The output generated by RBFNN, v(t) acts as the input to the state-space system, which translates the inputs to system outputs y(t). The intermediate data between the non-linear and linear parts is inaccessible to measurements.

The equations for a discrete time state-space representation are given by:

$$x(t+1)=Ax(t)+Bv(t)+w(t) \quad (1)$$

$$y(t)=Cx(t)+Dv(t)+z(t) \quad (2)$$

where y(t) is the system output, v(t) is the output of the nonlinear part, and consequently the input to the linear part, and $x(t) \in \Re^n$ is the state vector for system of $n^{th}$ order observed at discrete time instant t. Additionally, z(t) is the measurement noise and w(t) is the process noise.

z(t) and w(t), the measurement noise and process noise, respectively, are zero mean white noise sequences with covariance matrices given by:

$$E\left[\begin{pmatrix} W \\ Z \end{pmatrix} (W^T \; Z^T)\right] = \begin{bmatrix} Q & S \\ S^T & R \end{bmatrix} \delta_{pq} \quad (3)$$

where E denotes expected value and $\delta_{pq}$ denotes a Kronecker delta.

In order to update the parameters of the model (with a goal of minimizing the output error measure), the output error measure is calculated as:

$$I=(y(t)-\hat{y}(t))^2 \quad (4)$$

where I is the cost index and ŷ is the output of the estimated model.

Figure 3:
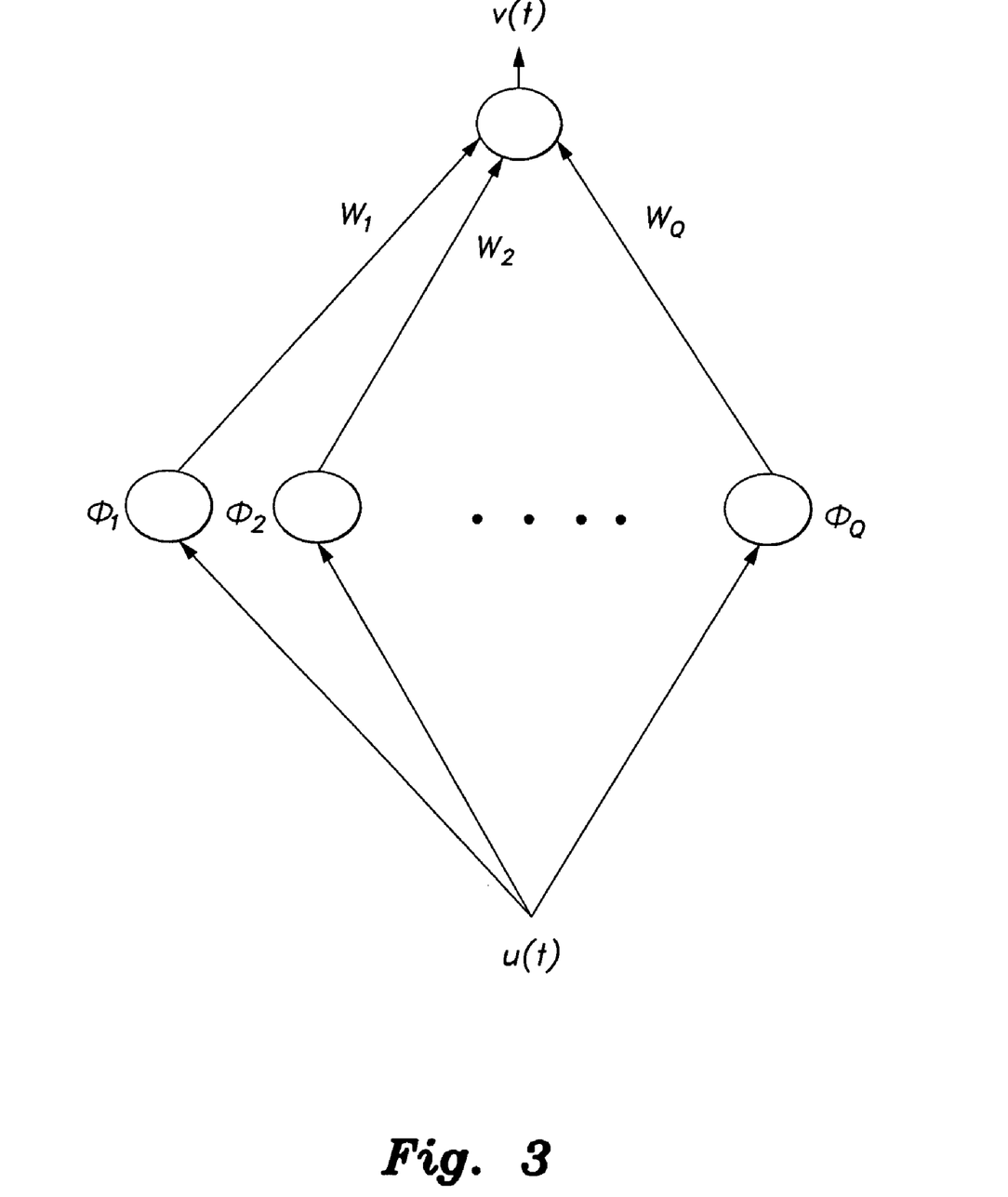
FIG. 3 is a diagram of a radial basis function neural network (RBFNN) having Q neurons.

RBFNN is an effective type of neural network that has proved useful in applications such as function approximation and pattern recognition. FIG. 3 illustrates an RBFNN with three layers having Q neurons in the hidden layer. The input layer connects the network to its environment. The second layer performs a fixed nonlinear transformation using basis functions. The output layer linearly weighs the response of the network to the output. Thus, the only adjustable parameters are the weights of this layer.

RBFNN output is given as:

$$v(t) = \sum_{i=1}^{Q} w_i \phi \|u(t) - c_i\| \quad (5)$$

where $c_i$ is the center for the $i^{th}$ neuron, Q is the number of neurons in the hidden layer, $w_i$ is the weight connecting the $i^{th}$ neuron node to the output layer, φ is the radial basis function (an arbitrary, generally nonlinear function), and ‖.‖ denotes the norm.

Subspace identification is used for estimating the parameters of the linear dynamic part of the model; i.e., the matrices of the state-space model. The present inventive method makes use of the N4SID numerical algorithm. The objective of the algorithm is to determine the order n of the system, and the system matrices A, B, C, and D without any prior knowledge of the structure of the system. This is achieved in two main steps: First, model order n and a Kalman filter state sequence of estimates $\hat{x}_i, \hat{x}_{i+1}, \ldots, \hat{x}_{i+j}$ are determined by projecting row spaces of data block Hankel matrices, and then applying a singular value decomposition. Next, the solution of a least squares problem is used to obtain the state space matrices A, B, C, and D. Given a large number of measurements of inputs u(t) and outputs y(t) generated by the unknown system of equations (1) and (2), the objective is to determine the order n of the system, the system matrices $A \in \Re^{n \times n}$, $B \in \Re^{n \times 1}$, $C \in \Re^{1 \times n}$, $D \in \Re^{1 \times 1}$, $Q \in \Re^{n \times n}$, $R \in \Re^{1 \times 1}$, and $S \in \Re^{n \times 1}$, and, if required, the Kalman gain matrix K, without any prior knowledge of the structure of the system.

The weights of the RBFNN are updated so as to minimize the cost index I. The least mean square method is used for this purpose. LMS is a type of gradient search technique, typically referred to as the "steepest descent algorithm", in which the weights of the nonlinear function are updated in the negative direction of the gradient of the cost function. This gives the weight update equation:

$$W(k+1) = W(k) - \eta \frac{\partial I}{\partial W} \quad (6)$$

where $\eta$ is the learning rate of the RBFNN, and is usually a relatively small number, and $W(k) \in \Re^{1 \times Q}$ is the weight vector for RBFNN at the $k^{th}$ iteration, given there are Q number of neurons in the network.

Partial derivatives of the cost function I of equation (4) with respect to W are computed as:

$$\frac{\partial I}{\partial W} = \frac{\partial e^2(t)}{\partial W}$$
$$= 2e(t)\frac{\partial e(t)}{\partial W}$$
$$= 2e(t)\frac{\partial}{\partial W}[y(t) - \hat{y}(t)]$$

and since the actual output data is independent of W, this simplifies to:

$$\frac{\partial I}{\partial W} = -2e(t)\frac{\partial \hat{y}(t)}{\partial W} \quad (7)$$

and since $\hat{y}(t)$ is the output of the estimated system, equation (7) reduces to:

$$\frac{\partial I}{\partial W} = -2e(t)\frac{\partial}{\partial W}[Cx(t) + Dv(t)].$$

Replacing x(t) in the above with equation (1) yields:

$$\frac{\partial I}{\partial W} = -2e(t)\frac{\partial}{\partial W}[C(Ax(t-1) + Bv(t-1)) + Dv(t)]$$

-continued
$$= -2e(t)\left[\frac{\partial CAx(t-1)}{\partial W} + \frac{\partial CBv(t-1)}{\partial W} + \frac{\partial Dv(t)}{\partial W}\right]$$
$$= -2e(t)\left[\frac{\partial CBv(t-1)}{\partial W} + \frac{\partial Dv(t)}{\partial W}\right]$$

and substituting the value of v(t) from equation (5) in the above produces:

$$\frac{\partial I}{\partial W} = -2e(t)\left[\frac{\partial CBW\Phi(t-1)}{\partial W} + \frac{\partial DW\Phi(t)}{\partial W}\right]$$
$$= -2e(t)\{CB\Phi(t-1) + D\Phi(t)\}$$

thus producing a weight update equation of:

$$W(k+1) = W(k) + 2e(t)\eta\{CB\Phi(t-1) + D\Phi(t)\} \quad (8)$$

where $\Phi(t)$ denotes the vector for the basis function of the neural network at discrete time instant t. An LMS subspace-based algorithm is then formulated. This algorithm uses equation (8) for training of RBFNN weights in combination with N4SID.

The computerized method relates to Hammerstein model identification, which, in essence, can be summarized as follows: Given a set of N noisy inputs $u(t)_{t=0}^{N-1}$ and outputs $y(t)_{t=0}^{N-1}$, find the weights of the RBFNN; and find the matrices of the state space model. Since the output y(t) is nonlinear in relation to the input u(t), the calculations are nontrivial. Thus, the LMS algorithm is utilized to update the weights of the neural network for each set of input and output data.

Figure 4:
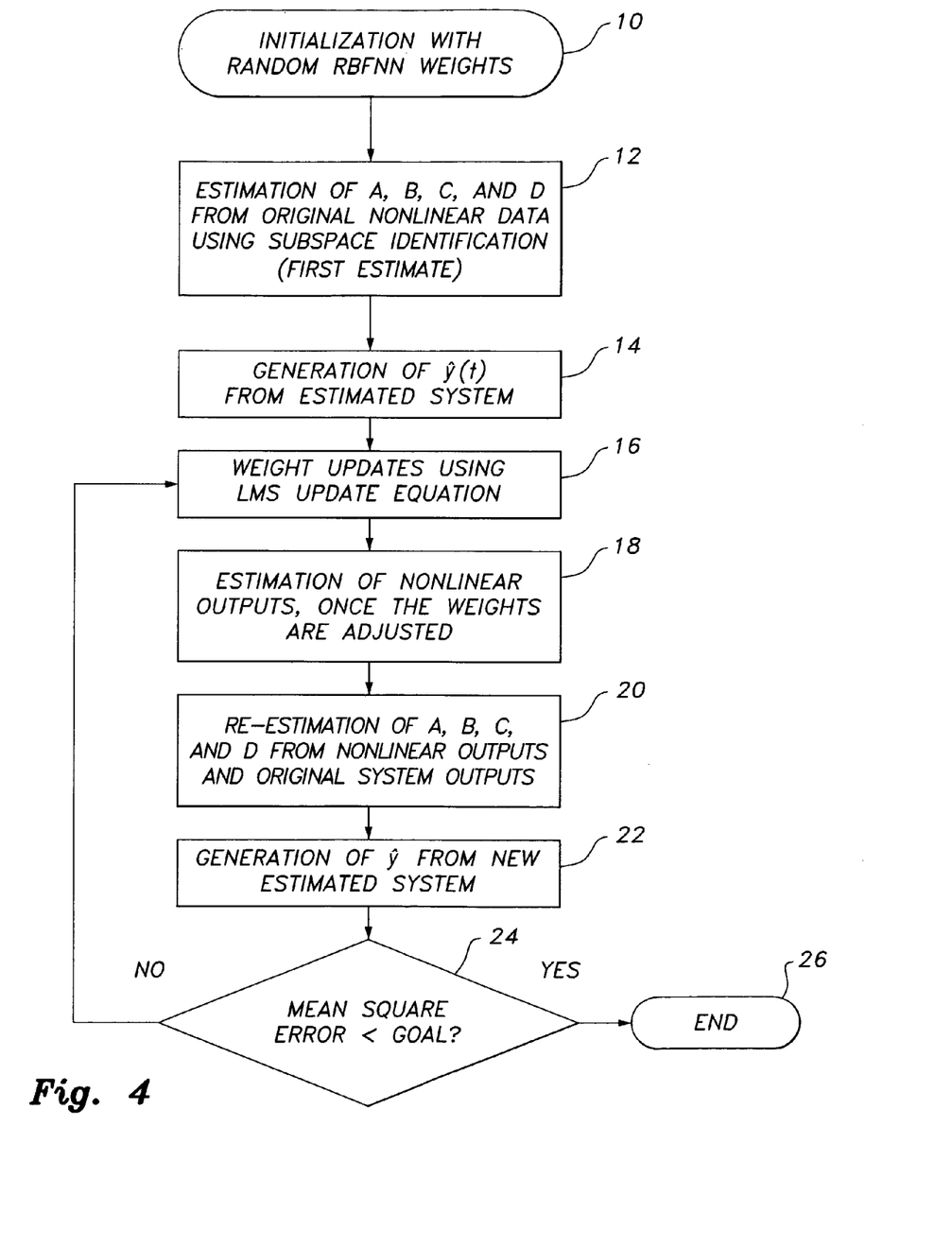
FIG. 4 is a flowchart showing an overview of the steps in a computerized method for identifying Hammerstein models according to the present invention.

As illustrated in FIG. 4, the computerized method includes the following steps: (1) estimation of state-space matrices A, B, C and D from original nonlinear data using subspace identification (i.e., an initial estimate, using N4SID) (step 12); (2) initialization of RBFNN using random synaptic weights (step 10); (3) output $\hat{y}(t)$ is generated and error is calculated from the model estimate of the system in step 1) (14 in FIG. 4); (4) the weights are updated using equation (8). This follows for all data points (step 16); (5) once the neural network is trained, intermediate data v is generated (step 18); (6) estimation of state-space matrices A, B, C and D from the new set of neural network outputs v and original system outputs y (this estimate of the state-space model is an improvement on the previous estimate) (step 20); (7) regeneration of output $\hat{y}$ from the new estimate of the complete Hammerstein system (step 22); and (8) repetition of steps (3) to (7) if the mean square error is not less than the required goal (step 24, with the method ending at 26 in FIG. 4).

Figure 5A:
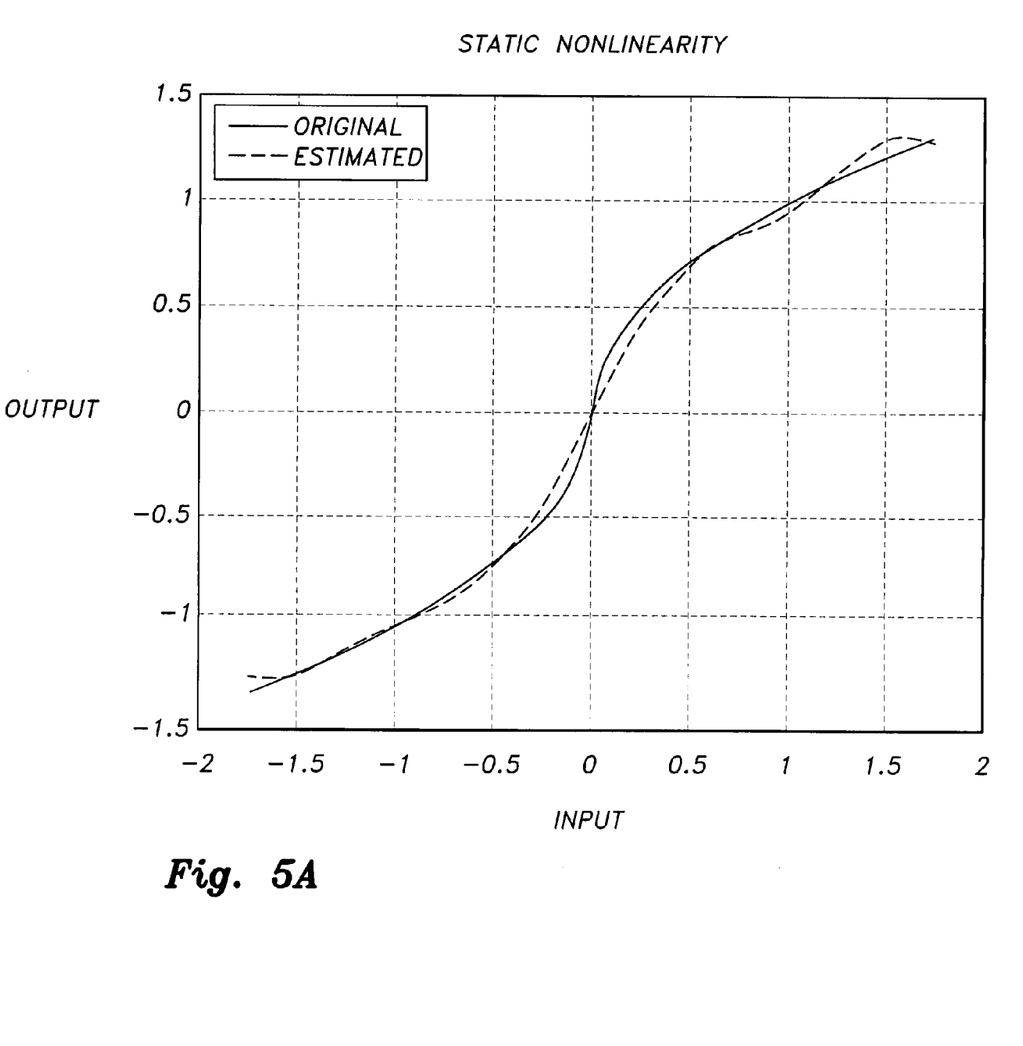
FIG. 5A is a graph showing actual and estimated values for the nonlinear portion of an exemplary Hammerstein model system in a first example of the computerized method for identifying Hammerstein models according to the present invention.
Figure 5B:
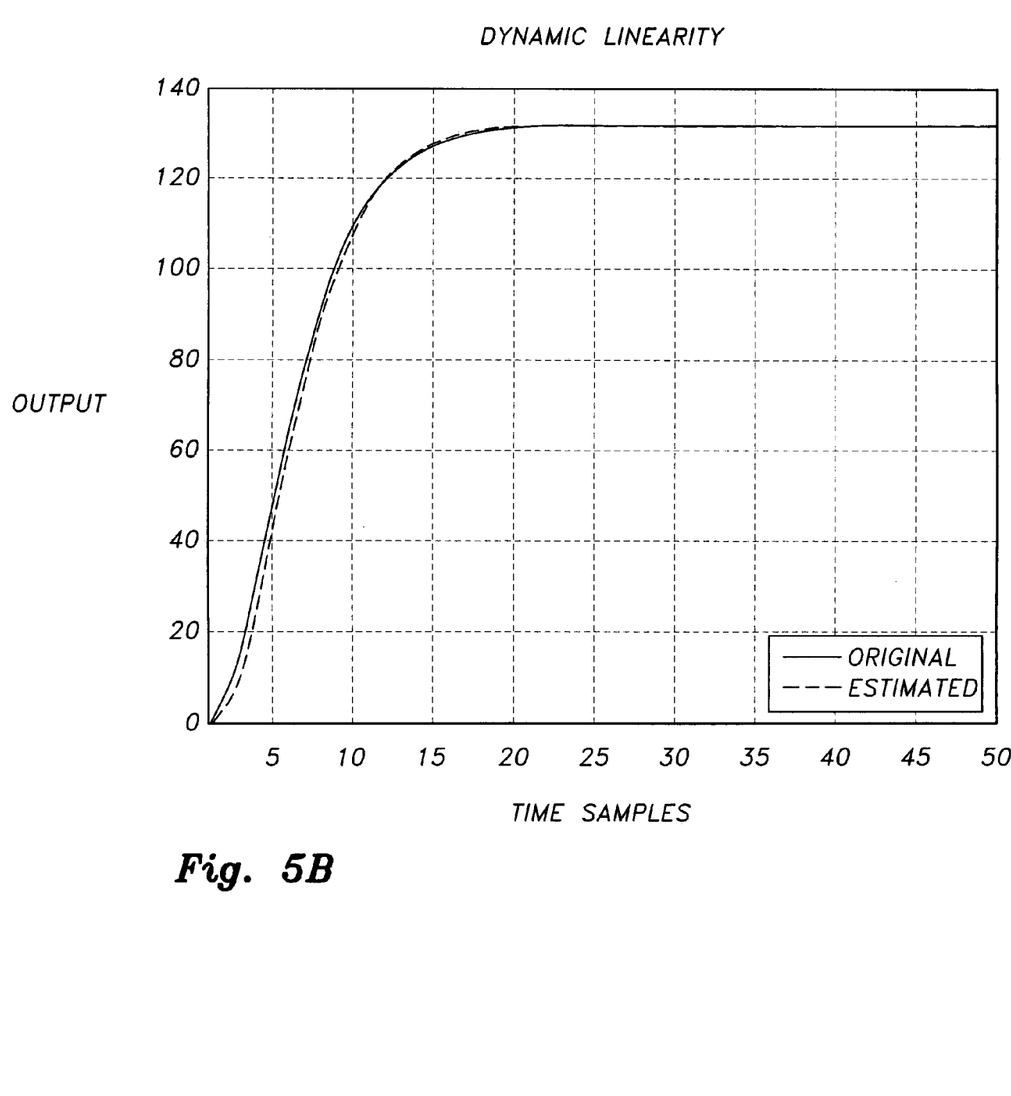
FIG. 5B is a graph showing actual and estimated values for the linear dynamic portion of the exemplary Hammerstein model system of FIG. 5A in a first example of the computerized method for identifying Hammerstein models according to the present invention.

In a first example of the method, the Hammerstein type nonlinear process includes a static nonlinearity given by:

$$v(t) = \sin(u(t))\sqrt{|u(t)|} \quad (9)$$

with the dynamic linear part being given by a third-order discrete time state-space system:

$$\begin{bmatrix} x_1(t+1) \\ x_2(t+1) \\ x_3(t+1) \end{bmatrix} = \begin{bmatrix} 1.80 & 1 & 0 \\ -1.07 & 0 & 1 \\ 0.21 & 0 & 0 \end{bmatrix} \begin{bmatrix} x_1(t) \\ x_2(t) \\ x_3(t) \end{bmatrix} + \begin{bmatrix} 4.80 \\ 1.93 \\ 1.21 \end{bmatrix} v(t) \quad (10)$$

$$y(t) = \begin{bmatrix} 1 & 0 & 0 \end{bmatrix} \begin{bmatrix} x_1(t) \\ x_2(t) \\ x_3(t) \end{bmatrix} \quad (11)$$

where, for this example, an RBF network of ten neurons is initialized with centers evenly distributed in the interval [−1.75, 1.751]. FIG. 5A shows that the shape of the nonlinearity has been accurately estimated, and FIG. 5B shows the step response of the dynamic linear part.

Figure 6A:
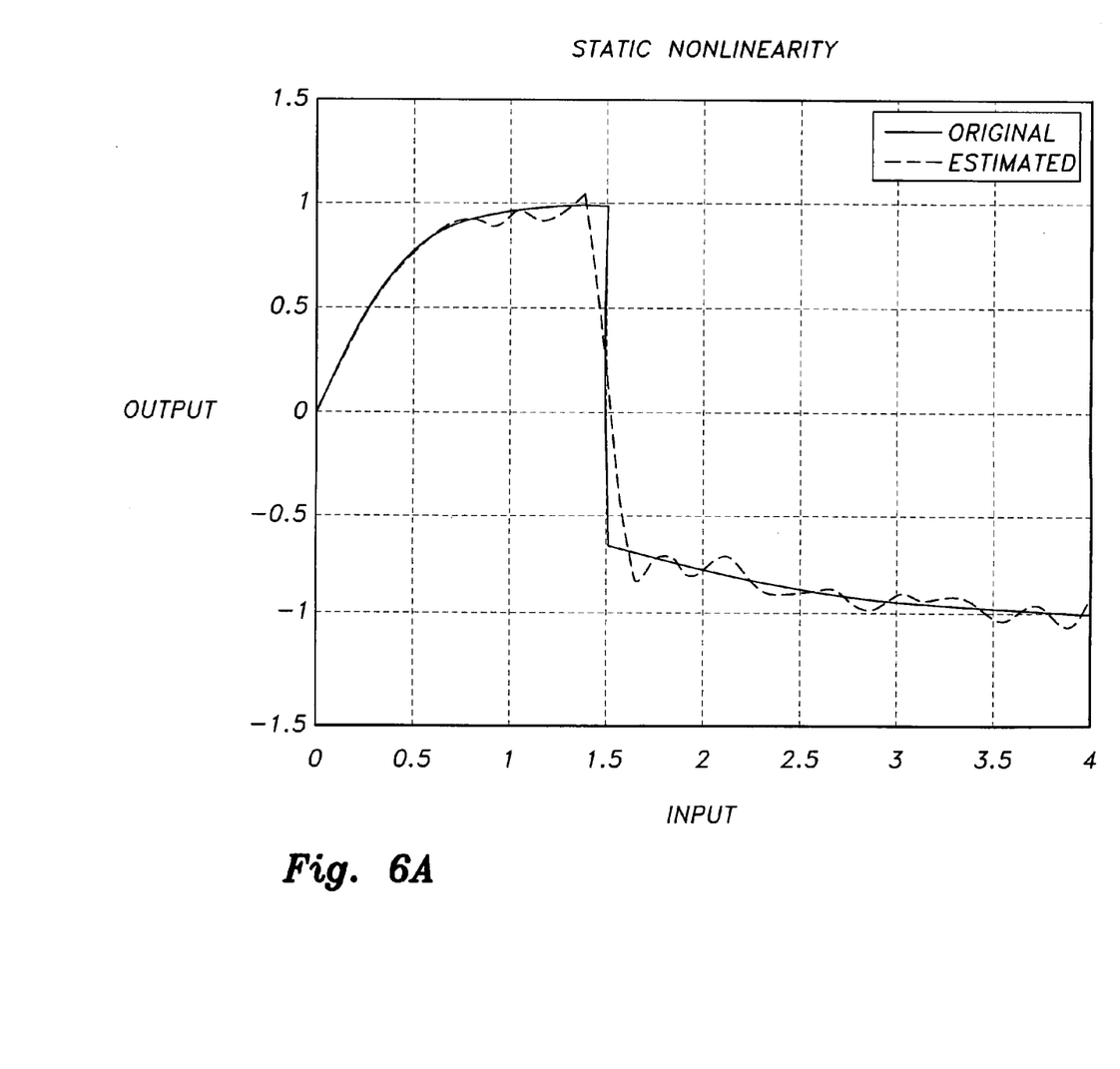
FIG. 6A is a graph showing actual and estimated values for the nonlinear portion of an exemplary Hammerstein model system in a second example of the computerized method for identifying Hammerstein models according to the present invention.
Figure 6B:
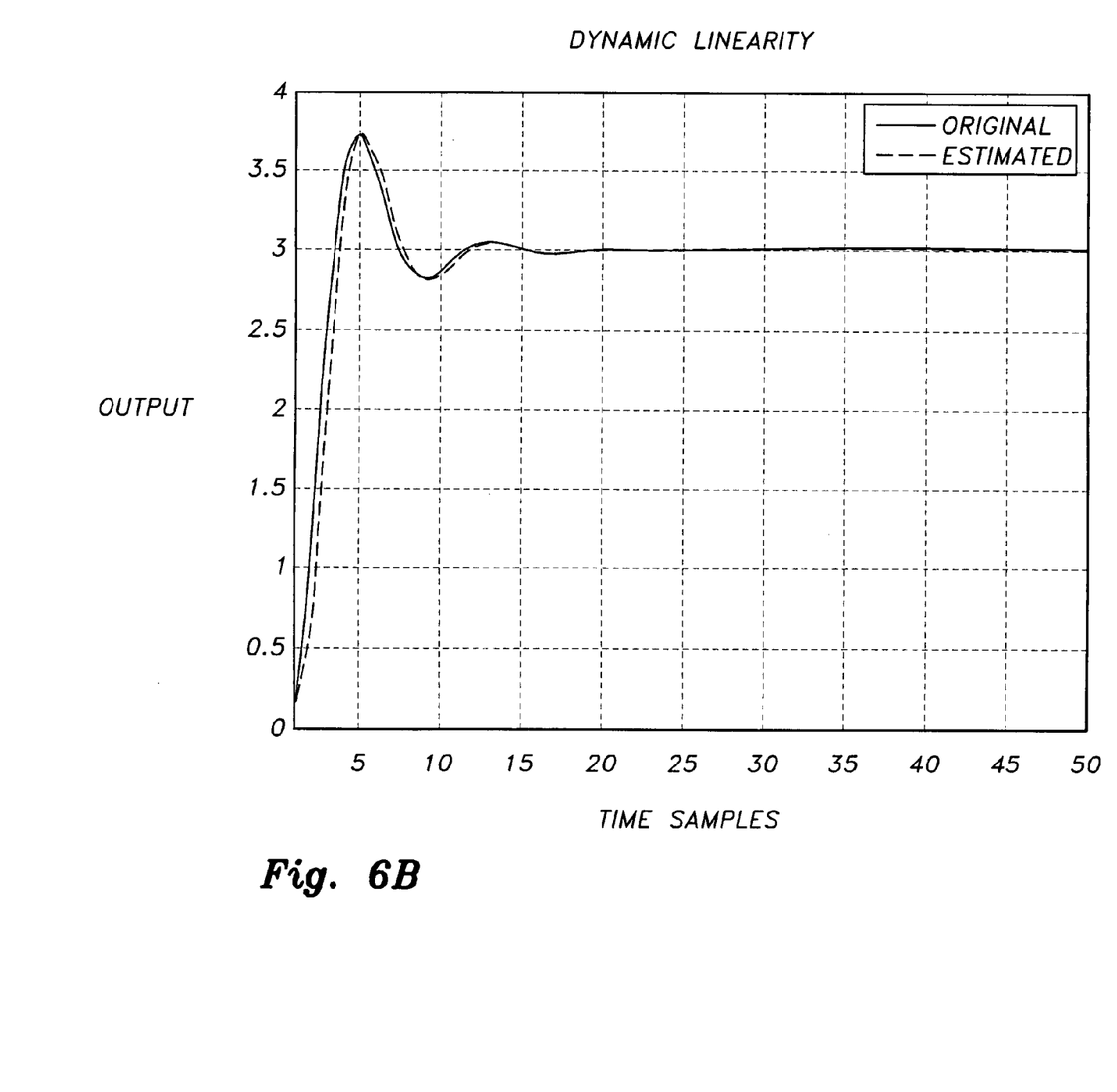
FIG. 6B is a graph showing actual and estimated values for the linear dynamic portion of the exemplary Hammerstein model system of FIG. 6A in a second example of the computerized method for identifying Hammerstein models according to the present invention.

In a second example, the Hammerstein type nonlinear process includes a static nonlinearity given by:

$$v(t) = \tanh[2u(t)] \quad 1.5 \geq u(t) \quad (13)$$

$$v(t) = \frac{\exp(u(t)) - 1}{\exp(u(t)) + 1} \quad 4 > u(t) > 1.5 \quad (14)$$

with the dynamic linear part being given by the following second-order discrete time state-space system:

$$\begin{bmatrix} x_1(t+1) \\ x_2(t+1) \end{bmatrix} = \begin{bmatrix} 1 & 1 \\ -0.5 & 0 \end{bmatrix} \begin{bmatrix} x_1(t) \\ x_2(t) \end{bmatrix} + \begin{bmatrix} 1 \\ 0.5 \end{bmatrix} v(t)$$

$$y(t) = \begin{bmatrix} 1 & 0 \end{bmatrix} \begin{bmatrix} x_1(t) \\ x_2(t) \end{bmatrix}$$

where, for this example, an RBF network with 15 neurons is initialized, and evenly distributed centers are chosen in the interval [0.4]. The LMS/Subspace algorithm is used to update the weights of the RBFNN and to find the parameters of the state-space model. The estimates of nonlinearity and step response of the linear part are shown respectively in FIGS. 6A and 6B.

The simulation results given above show that the LMS-subspace method performs well in estimating the shape of the nonlinearities. Eigenvalues of the linear dynamic subsystems are shown below in Table I.

TABLE I

Eigenvalues of linear subsystem

|  | $\lambda_1$ | $\lambda_2$ | $\lambda_3$ |
|---|---|---|---|
| Example 1 (original) | 0.7 | 0.6 | 0.5 |
| Example 1 (estimated) | 0.7173 | 0.5428 ± 0.0539i | 0.5428 ± 0.0539i |
| Example 2 (original) | 0.5 ± 0.5i | 0.5 ± 0.5i | |
| Example 2 (estimated) | 0.497 ± 0.5i | 0.497 ± 0.5i | |

The values in Table I show that the linear parts of the Hammerstein models have also been closely identified in both the examples. The computerized method combines the advantages of LMS with those of state-space models. LMS is well know to outperform other EAs in finding global optima, and state-space models can more easily be extended to systems with multiple inputs and outputs, as compared to polynomial models.

Figure 7:
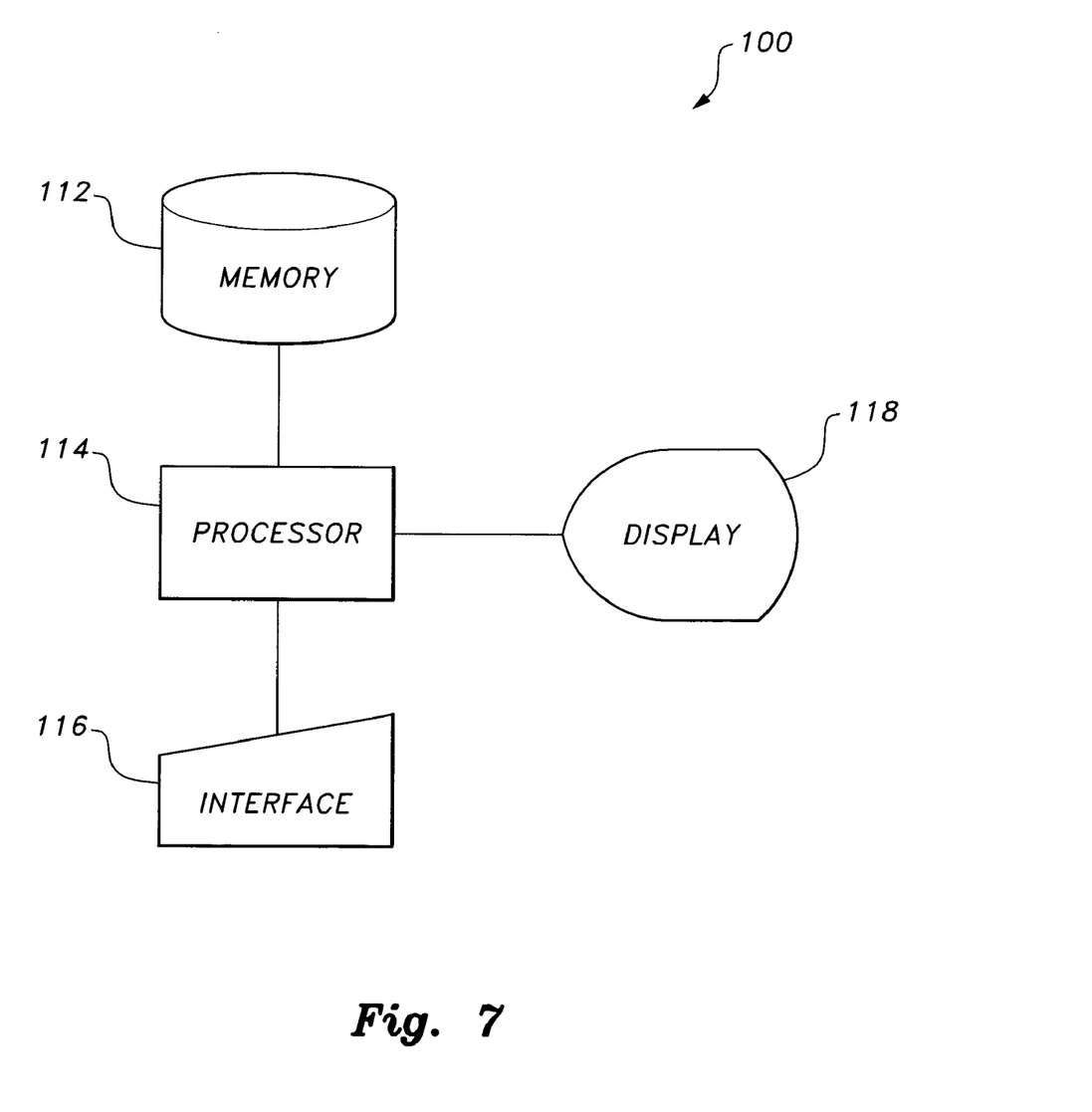
FIG. 7 is a block diagram of an exemplary computer system for implementing the computerized method for identifying Hammerstein models according to the present invention.

In the above, the calculations may be performed by any suitable computer system, such as that diagrammatically shown in FIG. 7. Data is entered into system 100 via any suitable type of user interface 116, and may be stored in memory 112, which may be any suitable type of computer readable and programmable memory. Calculations are performed by processor 114, which may be any suitable type of computer processor and may be displayed to the user on display 118, which may be any suitable type of computer display.

It is to be understood that the present invention is not limited to the embodiments described above, but encompasses any and all embodiments within the scope of the following claims.

We claim:

1. A computerized method for identifying Hammerstein models, comprising the steps of:
    (a) receiving a set of nonlinear system data from a plant;
    (b) estimating a set of state-space matrices A, B, C and D from the set of nonlinear system data using subspace identification;
    (c) calculating a set of random synaptic weights and initializing a radial basis function neural network with the set of randomly calculated synaptic weights;
    (d) calculating an output value ŷ(t);
    (e) calculating an error value based upon the output value ŷ(t) calculated in step (d) and based upon the estimation of step (b);
    (f) updating the set of synaptic weights for the radial basis function neural network to train the radial basis function neural network;
    (g) following training of the radial basis function neural network, calculating intermediate data v;
    (h) re-estimating the state-space matrices A, B, C and D from the radial basis function neural network outputs v calculated in step (g) and a set of original system outputs y;
    (i) recalculating a set of system outputs ŷ(t) from the re-estimated state space matrices A, B, C and D of step (f);
    (j) calculating an output error measure; and
    (k) repeating steps (c) to (j) if the calculated output error measure is greater than a pre-selected threshold error measure.

2. The method for identifying Hammerstein models as recited in claim 1, wherein the set of state-space matrices are estimated by calculating x(t+1)=Ax(t)+Bu(t)+w(t) and y(t)=Cx(t)+Du(t)+z(t), wherein u(t) represents an input of the Hammerstein system and y(t) represents an output of the Hammerstein system observed at a discrete time instant t, z(t) represents measurement noise, and w(t) represents process noise.

3. The method for identifying Hammerstein models as recited in claim 2, wherein the output error measure I is calculated as I=(y(t)−ŷ(t))².

4. The method for identifying Hammerstein models as recited in claim 3, wherein the intermediate data of the radial basis function neural network outputs are calculated as $$v(t) = \sum_{i=1}^{Q} w_i \phi \|u(t) - c_i\|,$$

wherein $c_i$ represents a center for an $i^{th}$ neuron, wherein i is an integer, Q represents a number of neurons in a hidden layer of the neural network, $w_i$ represents a weight connecting the $i^{th}$ neuron node to an output layer, u(t) represents a noisy input, and φ represents a radial basis function.

5. The method for identifying Hammerstein models as recited in claim 4, wherein the step of updating the set of synaptic weights for the radial basis function neural network includes calculation of a $k^{th}$ weight W(k), where k is an integer, as W(k+1)=W(k)+2e(t)η{CBΦ(t−1)+DΦ(t)}, wherein Φ(t) represents a vector for the basis function of the radial basis function neural network at the discrete time t, e(t) represents error at the discrete time t, and η is a learning rate of the radial basis function neural network.

6. A system for identifying Hammerstein models, comprising:
    a processor;
    computer readable memory coupled to the processor;
    a user interface coupled to the processor;

a display coupled to the processor;
software stored in the memory and executable by the processor, the software having:
   means for receiving a set of nonlinear system data from a plant;
   means for estimating a set of state-space matrices A, B, C and D from the set of nonlinear system data using subspace identification;
   means for calculating a set of random synaptic weights and
initializing a radial basis function neural network with the set of randomly calculated synaptic weights;
   means for calculating an output value $\hat{y}(t)$;
   means for calculating an error value based upon the output value $\hat{y}(t)$ and the estimation of the set of state-space matrices;
   means for updating the set of synaptic weights for the radial basis function neural network to train the radial basis function neural network;
   means for calculating intermediate data v;
   means for re-estimating the state-space matrices A, B, C and D from the estimated radial basis function neural network outputs v and a set of original system outputs y;
   means for recalculating a set of system outputs $\hat{y}(t)$ from the
re-estimated state-space matrices A, B, C and D; and
   means for calculating the output error measure.

7. A computer software product that includes a non-transitory medium readable by a processor, the non-transitory medium having stored thereon a set of instructions for identifying Hammerstein models, the instructions comprising:
   (a) a first sequence of instructions which, when executed by the processor, causes the processor to receive a set of nonlinear system data from a plant;
   (b) a second sequence of instructions which, when executed by the processor, causes the processor to~estimate a set of state-space matrices A, B, C and D from the set of nonlinear system data using subspace identification;
   (c) a third sequence of instructions which, when executed by the processor, causes the processor to calculate a set of random synaptic weights and initializing a radial basis function neural network with the set of randomly calculated synaptic weights;
   (d) a fourth sequence of instructions which, when executed by the processor, causes the processor to calculate an output value $\hat{y}(t)$;
   (e) a fifth sequence of instructions which, when executed by the processor, causes the processor to calculate an error value based upon the output value $\hat{y}(t)$ calculated in the fourth sequence of instructions and based upon the estimation of the second sequence of instructions;
   (f) a sixth sequence of instructions which, when executed by the processor, causes the processor to update the set of synaptic weights for the radial basis function neural network to train the radial basis function neural network;
   (g) a seventh sequence of instructions which, when executed by the processor, causes the processor to calculate intermediate data v;
   (h) an eighth sequence of instructions which, when executed by the processor, causes the processor to re-estimate the state-space matrices A, B, C and D from the radial basis function neural network outputs v calculated in the seventh sequence of instructions and a set of original system outputs y;
   (i) a ninth sequence of instructions which, when executed by the processor, causes the processor to recalculate a set of system outputs $\hat{y}(t)$; from the re-estimated state-space matrices A, B, C and D of the eighth sequence of instructions;
   (j) a tenth sequence of instructions which, when executed by the processor, causes the processor to calculate an output error measure; and
   (k) an eleventh sequence of instructions which, when executed by the processor, causes the processor to repeat the third through the tenth sequences of instructions if the calculated output error measure is greater than a pre-selected threshold error measure.

\* \* \* \* \*